United States Patent
Maligon et al.

(10) Patent No.: US 10,947,827 B2
(45) Date of Patent: Mar. 16, 2021

(54) METHOD FOR EXERTING A COMBINED EFFECT ON THE NEAR-WELLBORE REGION OF A PRODUCING FORMATION

(71) Applicant: Sergey Petrovich Maligon, Kharkovskaya obl. (UA)

(72) Inventors: Sergey Petrovich Maligon, Kharkovskaya obl. (UA); Aleksey Aleksandrovich Palko, Kharkov (UA); Aleksey Vladimirovich Simonenko, Kharkov (UA)

(*) Notice: Subject to any disclaimer, the term of this patent is extended or adjusted under 35 U.S.C. 154(b) by 0 days.

(21) Appl. No.: 16/489,930

(22) PCT Filed: Feb. 26, 2018

(86) PCT No.: PCT/UA2018/000017
§ 371 (c)(1),
(2) Date: Aug. 29, 2019

(87) PCT Pub. No.: WO2018/160156
PCT Pub. Date: Sep. 7, 2018

(65) Prior Publication Data
US 2020/0240249 A1  Jul. 30, 2020

(30) Foreign Application Priority Data
Mar. 3, 2017 (UA) .............................. a 2017 02064

(51) Int. Cl.
*E21B 43/24* (2006.01)
*C09K 8/592* (2006.01)
(Continued)

(52) U.S. Cl.
CPC .............. *E21B 43/24* (2013.01); *C09K 8/592* (2013.01); *C09K 8/72* (2013.01); *E21B 43/26* (2013.01); *C09K 8/426* (2013.01)

(58) Field of Classification Search
CPC ........ E21B 43/243; E21B 43/24; E21B 43/25; E21B 43/255; E21B 43/2605;
(Continued)

(56) References Cited

U.S. PATENT DOCUMENTS 6,488,086 B1 * 12/2002 Daragan ............... E21B 43/243
166/260
9,228,424 B2 * 1/2016 Zavolzhskiy ............ C09K 8/66
(Continued)

FOREIGN PATENT DOCUMENTS

CN  102942913 B * 9/2014
RU   97109595 A   5/1999
(Continued)

OTHER PUBLICATIONS

Google Translate, translation of "Hydrogenation heat gas chemical yield increasing solution component applied to shallow well," CN 102942913 B, retrieved Oct. 13, 2020 (Year: 2020).*
(Continued)

*Primary Examiner* — Angela M DiTrani Leff
(74) *Attorney, Agent, or Firm* — Nadya Reingand; Yan Hankin

(57) ABSTRACT

The invention allows for an increase in formation permeability and well flow rate. In a method for exerting a combined effect on the near-wellbore region of a producing formation, the following are fed separately and consecutively into the near-wellbore region: a process fluid No. 1 with a density of 1.3-1.4 g/cm3, followed by a process fluid No. 2 with a density of 1.6-1.8 g/cm3, which combines with the fluid No. 1. As a result, an exothermic reaction of heat and gas release occurs, producing an increase in temperature and pressure in the near-wellbore region. The process fluids contain hydroreactive mixtures, combustible oxidizing mixtures, and combustion initiators. Process fluid No. 1 contains, as combustion initiator, sodium hydride, NaH, and powdered nanoaluminium, Al. In a second step, a process fluid No. 3, an acidic solution containing hydrochloric acid, is fed into the wellbore.

1 Claim, 3 Drawing Sheets

(51) Int. Cl.
*C09K 8/72* (2006.01)
*E21B 43/26* (2006.01)
*C09K 8/42* (2006.01)

(58) Field of Classification Search
CPC ...... E21B 43/26; E21B 43/27; E21B 43/2607;
C06D 5/00; C06D 5/023; C06D 5/04;
C06D 5/06; C06D 5/08; C06D 5/10;
C09K 8/70; C09K 8/72; C09K 8/74;
C09K 8/62; C09K 8/64; C09K 8/66;
C09K 8/665; C09K 8/68; C09K 8/592;
C09K 8/426; C09K 8/24
USPC ....... 166/256, 257, 259, 260, 261, 262, 299,
166/300, 307, 308.1
See application file for complete search history.

(56) References Cited

U.S. PATENT DOCUMENTS

| | | | | |
|---|---|---|---|---|
| 9,664,018 | B2* | 5/2017 | Vandeponseele | E21B 43/26 |
| 10,081,759 | B2* | 9/2018 | Wernimont | C09K 8/592 |
| 2013/0206400 | A1* | 8/2013 | Alexandrov | C09K 8/592 |
| | | | | 166/250.01 |
| 2014/0166632 | A1* | 6/2014 | McWhirter | B65D 5/0281 |
| | | | | 219/121.61 |
| 2014/0338914 | A1* | 11/2014 | Clements | C09K 8/80 |
| | | | | 166/307 |
| 2015/0144344 | A1* | 5/2015 | Mazyar | E21B 43/24 |
| | | | | 166/302 |
| 2016/0230522 | A1* | 8/2016 | Daniel | E21B 43/24 |

FOREIGN PATENT DOCUMENTS

| | | | |
|---|---|---|---|
| UA | 102501 C2 * | 7/2013 | |
| WO | 2014167012 A1 | 10/2014 | |

OTHER PUBLICATIONS

Google Translate, translation of "Method of Complex Hydrogen and Thermobarochemical Influence on Cutting Productive Layer Zone," UA 102501 C2, retrieved Oct. 13, 2020 (Year: 2020).*

Google Translate, translation of "Method and composition for processing the layer," RU 97109595, retrieved Oct. 13, 2020 (Year: 2020).*

Google Translate, translation of "Method for hydraulically fracturing a subterranean formation using aluminium particles," WO 2014167012A1, retrieved Oct. 13, 2020 (Year: 2020).*

* cited by examiner

METHOD FOR EXERTING A COMBINED EFFECT ON THE NEAR-WELLBORE REGION OF A PRODUCING FORMATION

CROSS-REFERENCE TO RELATED APPLICATIONS

The present patent application is a National stage application from PCT/US2018/000017 filed Feb. 26, 2018 which claims priority to Ukranian patent application UA a201702064 filed Mar. 3, 2017.

FIELD OF INVENTION

The invention relates to the oil and gas field, and in particular to methods for increasing the productivity of oil wells by changing the permeability of the producing formation to increase the flow rate of the wells, as well as the rate of flow of liquid minerals (oil, gas, gas condensate, etc.) into the wells to increase their productivity and intensification of liquid mining.

BACKGROUND

The volume of production of liquid minerals from the near-wellbore region of a productive formation per day depends on a number of parameters, primarily on the permeability of the producing formation. To ensure the necessary rate of liquid hydrocarbon outflow from remote areas of the producing formation to the production site, periodic restoration or improvement of the permeability of the producing formation is required.

At the same time, the productivity of a well depends on the density and viscosity of oil, the presence of deposits of paraffin and asphalt-resinous substances in the producing formation and the near-wellbore region. In the process of drilling a well, sludge particles, together with the drilling fluid, clog the near-wellbore region, impairing the filtration properties of the producing formation, which initially reduces the level of production, even before the well is put into operation.

All methods of influencing the near-wellbore region of a productive formation during operation can be divided into three main groups: chemical (acid treatment, treatment with surfactants, chemicals and organic solvents), mechanical (hydraulic fracturing, hydro sandblasting, vibration exposure) and thermal (steam heat treatment, hot-acid treatment). However, all of them are associated with high cost, high complexity of work, or ineffective in low-permeable productive formations, as well as in formations with high-viscosity liquid minerals, in particular oil.

The most effective known methods for increasing the permeability of the formation are usually based on the technology of hydraulic fracturing. However, well-known fracturing technologies are expensive and environmentally unsafe. Hydraulic fracturing is a rather expensive technology that requires the use of equipment with a high level of energy consumption, as well as a long time for processing rock. Moreover, the results of its application are difficult to control, and, as experience in its application in oil fields has shown, such results are unstable in both quantitative and temporal respects.

The production of liquid minerals from the producing formation requires sufficient permeability of the producing formation to provide the necessary rate of fluid flow into the well from the remote areas of deposit.

A common technology for restoring or increasing the flow rate of liquid minerals (hereinafter referred to as fluid) from a productive formation is to change its structure by means of hydrogen thermochemical treatment of the near-wellbore region of the specified formation, which leads to decompression of rock in the near-wellbore region and, accordingly, to increase the permeability of the formation, due to the formation of macro- and microcracks in the rock and, accordingly, the creation of channels for fluid flow to the extraction site.

A known method of thermobarochemical treatment of a producing formation and a device for its implementation (see patent for invention KZ (13) A (11) 17779, M. class. E21 B 43/24). The method is carried out due to thermobarochemical effects on the producing formation, as a result of which some decompression of the producing formation is provided. The device, which is used for thermobarochemical treatment of the bottom-hole region of the formation, includes thermogas and air chambers made in housings of sealed tubular elements, which are separated by a combustible element sealed between the chambers, while the combustible element is made of gas-emitting solid end-face fuel.

The disadvantage of this method is the low productivity, due to the low efficiency of the chemical effect on the producing formation from the side of the combustible material, as well as a short exposure to the producing formation (not more than one hour). When implementing the known method, the main effect is carried out on the producing formation and the region of mudding, however, there is no effect on the fluid located in the specified producing formation. The short exposure and the risk of damage to the casing, as a result of an uncontrolled explosion, limits the application of this method.

A known method of thermochemical treatment of a producing formation and a combustible-oxidizing composition for its implementation (see patent RU No 2153065, M. CL E21 B43/24, E21 B43/25, publ. 20 Jul. 2000), which includes injection into the near-wellbore region of productive formation of a combustible-oxidative mixture and then delivery to the specified region of the combustion initiator, which is used as a composition based on alkali metal borohydride and methanol or diethyl ether and/or solid isopropyl carborane. The hot oxidizing mixture contains a complex compound of oxalic acid diamide and nitric acid, salicylic acid acetic ester, potassium permanganate, isopropyl carborane, water and ammonium nitrate.

The disadvantage of this method is the high cost of the components used, as well as the complexity of obtaining isopropyl carborane. At the same time, the implementation of the method is associated with a high risk for well equipment and maintenance personnel. This is due to the fact that the initiator of combustion is delivered to the region of the producing formation in a sealed container using a winch, where the container is blown up using cord torpedoes powered by an electric power source. Such a method of introducing a combustion initiator into a region of the productive formation is fraught with the risk of a torpedo failing or incomplete reaction of the components of a combustion initiator with a combustible-oxidizing mixture.

A known method of thermochemical processing of a productive formation (see declaration patent UA No 46425 A, M. class. E21 B43/24, publ. May 15, 2002) includes the delivery through a tubing to the near-wellbore region of the productive formation of a combustible-oxidative mixture, hydroreacting composition and stabilizing additives. This way characterized by the fact that in the treatment region separately-sequentially, by using a buffer liquid of carbon tetrachloride, a two-complex fuel-oxidation mixture is pumped, which, when the components of the composition interact in the treatment region of the producing formation, initiates the ignition of the system of the fuel-oxidation mixture—water-reactive composition, with the ratio of the mass of water the mass of the hydroreacting composition of 2.7:36.0. As hydroreactive additives, metal boron $LiB_2$, $LiB_{10}$, $AlB_{10}$, $AlB_{12}$ are also used The disadvantages of this invention is the use of labor-intensive and expensive components of a hydroreacting composition, in particular boron intermetallic compounds. The disadvantages include the low productivity of the method due to the production of hydrogen in one stage, which reduces the potential for its use, and also does not allow to control the process of heat and gas creation.

The closest is a method of complex impact on the near-wellbore region of a productive formation (see patent UA No 102501, E21 B 43/24, publ. Jul. 10, 2013), according to which first a well with at least one perforation located in the region of the producing formation, plug it with water or a kill fluid, and then through pump compressor pipes to the bottom of the well, the process fluid No 1, with a density of 1.3-1.4 $g/cm^3$ is separately and sequentially installed, then the tubing is installed at a height of 20-25 m above the upper part by perforation perforation and through them the process fluid No 2 is fed into the well, with a density of 1.6-1.8 $g/cm^3$, which, entering the interaction region process fluids No 1 and No 2, which interacts through perforation with the near-wellbore region of the producing formation, mixes with the process fluid No 1, resulting in an exothermic reaction of heat and gas evolution with increasing temperature and pressure in the near-wellbore region of the producing formation, which leads to heating of the producing formation, as well as the formation of multiple microcracks in it and the improvement of its filtration characteristics, while the composition of these process fluids No 1 and No 2 includes hydroreactive mixtures, combustible-oxidative mixtures and combustion initiator, containing hydroreactive composition on the basis of aluminum.

The disadvantages of this method are its low productivity and productivity, due to the fact that the process fluid No 1 and No 2 are combustible oxidizing mixtures, which are aqueous solutions of salts, therefore during and after killing with water or a killing fluid, the concentration of the components of these solutions is significantly reduced due to dilution with water, which leads to a decrease in the reaction temperature of heat and gas evolution, and also does not allow to really control the process of thermochemical exposure. Also in the known method, the hydroreactive mixtures are evenly distributed in the process fluids No 1 and No 2, due to which most of the hydrogen is oxidized directly in the wellbore without affecting the producing formation and fluid.

SUMMARY OF THE INVENTION

The present invention is to develop a method of complex impact on the near-wellbore region of the producing formation, in which through the use of stepwise hydrogen thermogasochemical and acid effects on the near-wellbore region of the producing formation, along with chemical and thermal effects on it, also provides physical effects on the specified formation.

Another objective of the method of complex impact on the near-wellbore region of the producing formation is to increase the production rate of the selected well in relation to neighboring wells, which were stuck due to mudding of the bottomhole formation region. As well as increasing the flow rate of wells in fields with hard to recover reserves due to low permeability and low porosity of the rock, or long idle wells, including after major or underground repairs, as well as wells that do not respond to other methods of intensification.

To achieve the task in the known method of complex impact on the near-wellbore region of the producing formation, according to which, first, the well with at least one section of perforation located in the region of the producing formation is plugged with water or a killing fluid, and then through the tubing to the bottom wells sequentially process fluid No 1 is supplied, with a density of 1.3-1.4 $g/cm^3$, then tubing pipes are installed at a height of 20-25 m above the upper section of perforation and the well is fed with a process fluid No 2, with a density of 1.6-1.8 $g/cm^3$, which, entering the region of interaction of the process fluids No 1 and No 2, interacting through perforation with the near-wellbore region of the producing formation, is mixed with the process fluid No 1, As a result, an exothermic reaction of heat and gas creation occurs with increasing temperature and pressure in the near-wellbore region of the productive formation, which leads to heating of the formation, as well as to the formation of multiple microcracks in it and an improvement in its filtration these characteristics, while the composition of the indicated process fluids No 1 and No 2 includes hydroreactive mixtures, combustible oxidizing mixtures and a combustion initiator containing an aluminum hydroreactive composition, according to the invention, the complex effect on the near-wellbore region of the producing formation is carried out in two stages, the first of which, above, a combustion initiator is additionally introduced into the composition of the process fluid No 1, which is used as sodium hydride NaH and nano-powder passivated by an oxide film lumina Al at a ratio of 1:(2-5) sodium hydride NaH powder to nanoaluminum Al powder, respectively, and then, after completion of the first stage, the second processing stage is carried out, in which the tubing is installed in the perforation region of the well, after which the well is fed with process fluid No 3, which is used as an acid solution containing hydrochloric acid with a concentration of 12-15% in an amount of 0.4-1.5 $m^3$ per 1 m of the thickness of the producing formation, as a result of which the producing formation that is heated at the first stage is exposed to additional acid treatment to increase newly formed microcracks in the first step of the claimed method and to improve the filtration characteristics of the formation.

To implement the proposed method for the integrated impact on the near-wellbore region of a productive formation, stepwise processing of the specified formation is performed. In this case, at the first stage, the well is plugged with water or a killing fluid, after which the process fluid No 1, with a density of 1.3-1.4 $g/cm^3$, is fed through the tubing to the bottom of the well, which leads to the filling of the bottom of the well in the interval from the bottom to the top perforation. Then the tubing is lifted and installed at a height of 20-25 m above the upper perforation, after which No 2 process fluid with a density of 1.6-1.8 $g/cm^3$, which is mixed with the process fluid No 1 which is fed into the well through them, as a result of which an exothermic reaction of heat and gas evolution occurs in the well with an increase in temperature and pressure. This occurs as a result of the interaction of process fluids No 1 and No 2, which include hydroreacting mixtures and fuel-oxidative mixtures. At the same time, the combustion initiator is part of the process fluid No 1, which is used as sodium hydride NaH and passivated by an oxide film nanoaluminum powder Al at a ratio of 1:(2-5) sodium hydride powder NaH to nanoaluminum powder AI, respectively.

Since the interaction region of the process fluids No 1 and No 2 located in the well is interacted through perforation with the near-wellbore region of the producing formation, the latter shows an increase in temperature and pressure. In this case, the formation warms up, and the resulting pressure pulses lead to the formation of multiple microcracks in it. Due to the impact on the producing formation of hydroreacting and combustible-oxidizing mixtures that are part of the No 1 and No 2 process fluids, the filtration characteristics of the formation are improved, as a result of which it is heated, viscosity decreases and fluid mobility increases, rock wettability increases, the dissolved mode is activated gas, provides better cleaning of the fluid from the rock, as well as an increase in the intensity of capillary impregnation of low-permeability fluid-saturated regions of the formation. Hydrogen generated as a result of the exothermic heat-gas evolution reaction penetrates the fluid-containing producing formation, in particular the oil-saturated producing formation, resulting in oil hydrocracking, as well as multi-stage destructive hydrogenation, which is a process for enriching paraffins with hydrogen—hydrogenation—and cracking hydrogenated raw materials under pressure of hydrogen in the presence of catalysts, which are zeolites that are part of the sandstone of which the product rock consists tive formation. As a result of destructive hydrogenation, various high-molecular paraffins are converted into a mixture of hydrogen-saturated low molecular weight compounds. Also, as a result of chemical reactions between the reaction products and the formation rock, the porosity of the formation and, consequently, the permeability of the formation increase.

The second processing stage is carried out after completion of the first processing stage. In the second stage of processing, the tubing is installed in the perforation region of the well and then the process fluid No 3 is fed into the well, which is used as an acid solution containing hydrochloric acid with a concentration of 12-15% in an amount of 0.4-1.5 m$^3$ per 1 m of the thickness of the producing formation. As a result, the productive layer heated in the first stage is subjected to additional acid treatment to increase the multiple microcracks newly formed in the first stage of the proposed method and to improve the filtration characteristics of the formation. The productive formation heated in the first stage is treated with acid. Unlike conventional acid treatment, acid moves along microcracks newly formed as a result of pressure pulses, expanding them and creating a new network of microcracks in the rock, and not only expanding old microcracks, as is usually the case with traditional methods of acid treatment, which often leads to the formation of caverns and deterioration of the permeability of the producing formation.

In a particular embodiment of the method, a redox mixture (RM-1) is used as the process fluid No 1 in the following ratio of ingredients:
  ammonium nitrate $NH_4NO_3$—44.0-54.0 mass %;
  sodium hydride NaH—2.8-3.2 mass %;
  powder nanoaluminum Al—5.6-15.6 mass %;
  hydrazine nitrate $N_2H_5NO_3$—3.0-5.0 mass %;
  oxamide nitrate $C_2O_2(NH_2)_2$—$HNO_3$ 0-3.0 mass %;
  1,2-bis(hydroxymethyl)-o-carborane $C_4B_{10}H_{16}O_2$ (99.9%)—3.0-5.0 mass %;
  hydrocarbon fuel—8.0-13.0 mass %;
  sodium chloride NaCl and/or potassium chloride KCl—4.5-5.5 mass %;
  nitric acid $HNO_3$—7.0-9.0 mass %;
  emulsifier—0.5-3.0 mass %;
  water—10.0-15.0 mass %, and as the process fluid No 2 use a redox mixture (RM-2) in the following ratio of ingredients:
  sodium nitrite $NaNO_2$—18.0-23.0 mass %;
  hydrocarbon fuel—8.0-13.0 mass %;
  urea $CO(NH_2)_2$—22.0-28.0 mass %;
  9-BBN $C_{16}H_{30}B2$—1.0-3.0 mass %;
  Carborane $C_2B_{10}H_{12}$ (99.9%)—3.0-6.0 mass %
  sodium chloride NaCl and/or potassium chloride KCl—4.5-5.5 mass %;
  emulsifier—0.5-3.0 mass %;
  water—24.0-27.0 mass %.

BRIEF DESCRIPTION OF THE DRAWINGS

To clarify the claimed invention are drawings, where.

DETAILED DESCRIPTION OF THE PREFERRED EMBODIMENTS OF THE INVENTION

Figure 1:
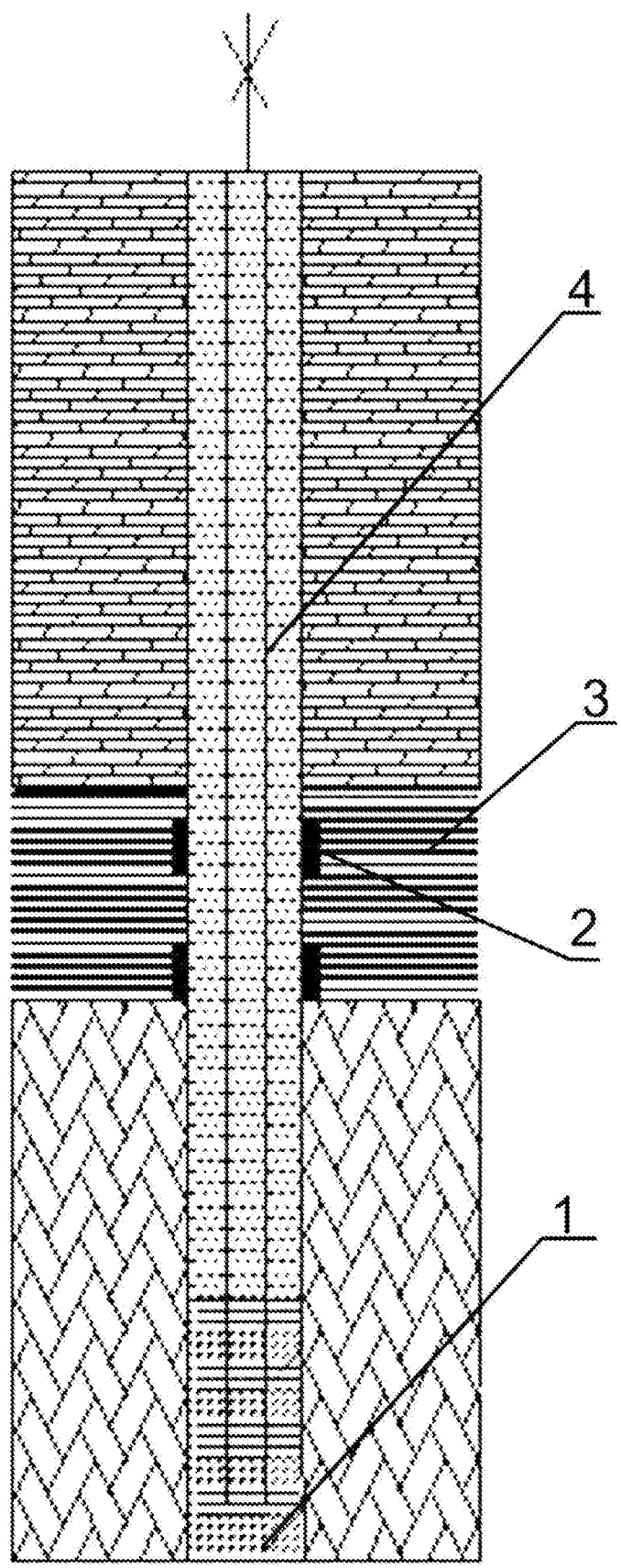
FIG. 1 shows a diagram of a well with tubing lowered into the bottom for supplying a process fluid No 1.
Figure 2:
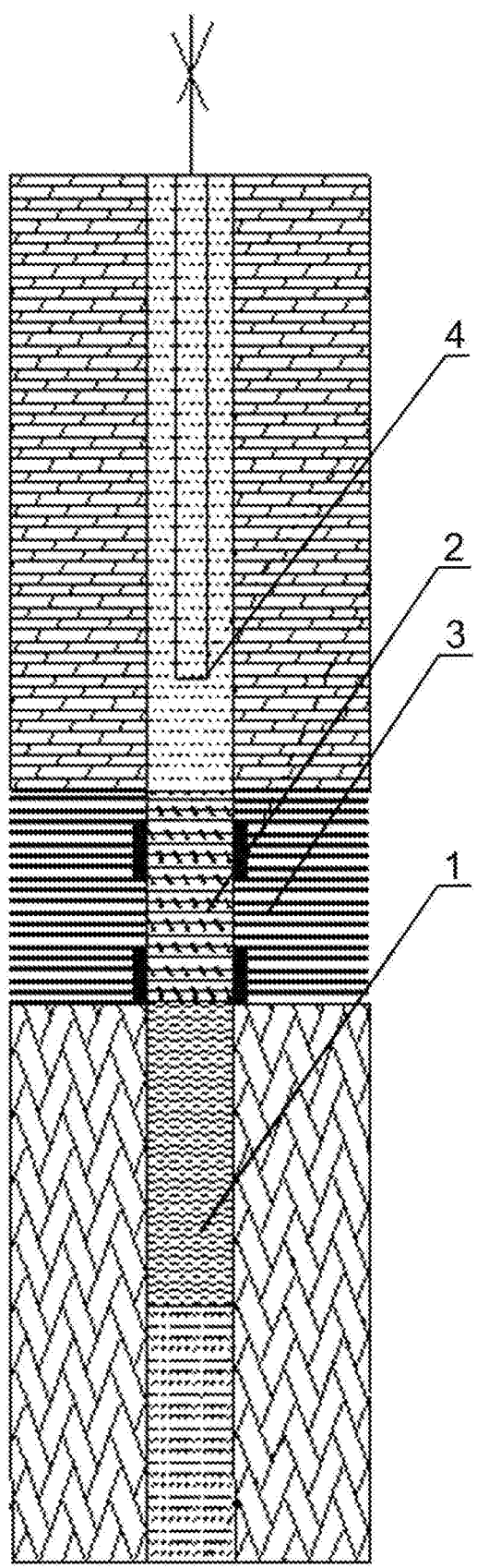
FIG. 2 is a diagram of a well with tubing raised above the upper portion of the perforation to supply No 2 process fluid to the well.

The method of complex impact on the near-wellbore region of the producing formation is carried out as follows. At the first stage, hydrogen thermogasochemical effect is made on the near-wellbore region of the producing formation. For this, the well 1 with the perforation section 2 located in the region of the productive formation 3 is plugged with water or a killing fluid (see FIG. 1). Then through the tubing 4 in the bottom hole 1 is fed process fluid No 1, density 1.3-1.4 g/cm$^3$. After filling the face with process fluid No 1, the tubing is raised to a height of 20-25 m above the upper section of perforation 2 (see FIG. 2). Then, through them into the well 1 is fed the process fluid No 2, with a density of 1.6-1.8 g/cm$^3$, which, entering the region of interaction of the process fluids No 1 and No 2, is mixed with the process fluid No 1, as a result of which exothermic the reaction of heat and gas creation with increasing temperature and pressure in the near-wellbore region of the producing formation 3. The composition of the indicated process fluids No 1 and No 2 includes hydroreactive mixtures, combustible oxidizing mixtures, and a combustion initiator. The exothermic reaction of heat and gas creation ensures the heating of producing formation 3 and the formation of multiple microcracks in it, which led to an improvement in its filtration characteristics.

The complex effect on the near-wellbore region of the productive formation 3 was carried out in two stages, at the first of which a combustion initiator containing a hydroreacting composition was additionally introduced into the process fluid No 1, using sodium hydride NaH and passivated with an oxide film nanoaluminum powder Al at a ratio of 1:(2-5) sodium hydride NaH powder to nano aluminum Al powder, respectively.

Since the interaction region of the process fluids No 1 and No 2 located in the well 1 is interacted by perforation 2 with the near-wellbore region of the productive formation 3, the latter shows an increase in temperature and pressure. In this case, productive formation 3 is heated, and the resulting pressure pulses lead to the formation of multiple microcracks in it. Due to the effect on the formation 3 of hydroreacting and combustible-oxidizing mixtures that are part of the process fluids No 1 and No 2, the filtration characteristics of formation 3 are improved, as a result of which it is warmed up, viscosity is decreased and fluid mobility is increased, in particular, oil. As a result of the activation of the dissolved gas regime, a more efficient washing of the fluid from the rock of the formation 3 is provided, and the intensity of capillary impregnation of low-permeable fluid-saturated regions of the formation 3 also increases. Also as a result of chemical reactions between reaction products and rock increase rock porosity and formation permeability 3.

The light fractions of the fluid, in particular the light fractions of oil, evaporate during heating, and with subsequent cooling and condensation, solvent rims form, resulting in a sharp increase in the efficiency of displacing the fluid (oil) from the productive formation 3. Thus, the use of the new method simultaneously allows bottom-hole region of well 1, productive formation 3 and fluid, and also increase the flow rate of the well by 2-10 times. Hydrogen generated during the exothermic reaction penetrates into the formation 3 containing fluid, in particular oil, resulting in oil hydrocracking, as well as multi-stage destructive hydrogenation, which enriched paraffins with hydrogen—hydrogenation—and cracked hydrogenated feed under hydrogen pressure in the presence of catalysts which are the zeolites that make up the sandstone of which the rock of formation 3 is composed. As a result of destructive hydrogenation, various high ecological paraffins turn into a mixture of low molecular weight compounds saturated with hydrogen.

Figure 3:
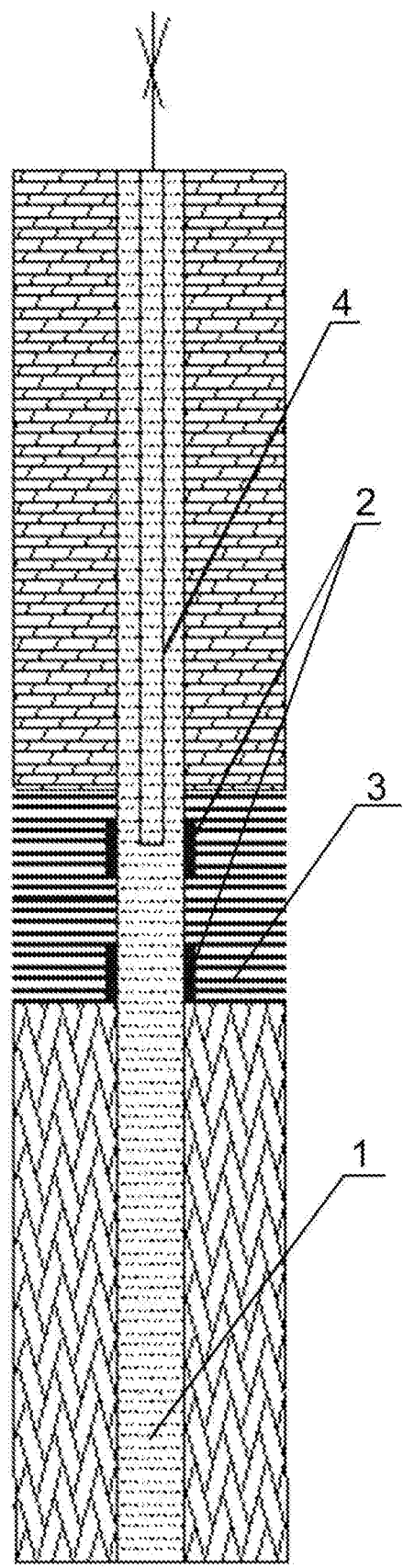
FIG. 3 is a diagram of a well with tubing installed in the area of the perforation section for supplying No 3 process fluid to the well.

After completion of the first stage, the second processing stage is carried out. In the second stage, tubing 4 is installed in the perforation region 2 of well 1 (see FIG. 3), and then No 3 process fluid is fed into well 1, which is used as an acid solution containing hydrochloric acid with a concentration of 12-15% in the amount of 0.4-1.5 m$^3$ per 1 m of the thickness of the productive formation 3. Thus, the productive formation 3 heated in the first stage is subjected to additional acid treatment to increase the multiple microcracks newly created in the first stage of the inventive method and form a branched channel structure for improving the filtration characteristics of the producing formation 3.

In accordance with above, the composition of the process fluid No 1 included the following ingredients: ammonium nitrate $NH_4NO_3$—44.0-54.0 mass %; sodium hydride NaH—2.8-3.2 mass %; powder nanoaluminum Al—5.6-15.6 mass %; hydrazine nitrate $N_2H_5NO_3$—3.0-5.0 mass %; oxamide nitrate $C_2O_2(NH_2)_2$—$HNO_3$—1.0-3.0 mass %; 1,2-bis(hydroxymethyl)-o-carborane $C_4B_{10}H_{16}O_2$ (99.9%)—3.0-5.0 mass %; hydrocarbon fuel—8-13 mass %; sodium chloride NaCl and/or potassium chloride KCl—4.5-5.5 mass %; nitric acid $HNO_3$ mass %; emulsifier—0.5-3.0 mass %, water—10-15 mass %.

Tall oil distillate mixed with a wetting agent in a ratio of 1:1 by weight is used as an emulsifier, and a mixture of diesel fuel and mineral oil in a ratio of 1:2 by weight, respectively, is used as a hydrocarbon fuel.

The method of obtaining process fluid No 1, namely, the redox mixture (RM-1), includes the separate preparation of an aqueous solution of an oxidizing agent (nitric acid and water) and a mixture of liquid hydrocarbon fuel with an emulsifier and their subsequent mixing at a temperature of 80° C. First, sodium or potassium chlorides, or a mixture of them in an amount of 4.5-5.5 mass %, and then ammonium nitrate are dissolved in a single container in water, then hydrazine nitrate, oxamide nitrate and nitric acid in the above amounts are added. In another tank at a temperature of 70° C., hydrocarbon fuel and an emulsifier are mixed, and then heated to 80° C., after which, with thorough mixing, the solution from the second tank is poured into the first.

Also, a combustion initiator containing a hydroreacting composition is additionally introduced into the process fluid No 1, which is used as sodium hydride NaH and passivated by an oxide film nanoaluminum powder Al at a ratio of 1:(2-5) sodium hydride powder NaH to nanoaluminum powder Al, respectively.

The composition of the process fluid No 2 includes the following ingredients: sodium nitrite $NaNO_2$—18.0-23.0 mass %; hydrocarbon fuel—8.0-13.0 mass %; urea $CO(NH_2)_2$—22.0-28.0 mass %; sodium chloride NaCl and/or potassium chloride KCl—4.5-5.5 mass %; emulsifier—0.5 to 3.0 mass %; 9-BBN $C_{16}H_{30}B_2$—1.0-3.0 mass %; carborane $C_2B_{10}H_{12}$ (99.9%)—3.0-6.0 mass % water—24.0-27.0 mass %.

The method of obtaining process fluid No 2, namely, the redox mixture (RM-2), includes the separate preparation of an aqueous solution of sodium nitrite and a mixture of liquid hydrocarbon fuel with an emulsifier and their subsequent mixing at a temperature of 80° C. First, chlorides are dissolved in water in a single container, sodium or potassium chlorides, or a mixture thereof in an amount of 4.5-5.5 mass %, and then sodium nitrite in an amount of 18.0-23.0 mass %. In another container, at a temperature of 70° C., hydrocarbon fuel and emulsifier are mixed in the above amounts, and then heated to 80° C., after which, with thorough mixing, the solution from the second container is poured into the first.

The required number of mixtures of RM-1 and RM-2 is calculated based on the structure of well 1 and the volume of its sump. Both process fluids No 1 and No 2 after entering the well 1 occupy the space from the bottom of the well to the upper perforation holes 2 in the well cavity 1. The ratio of the RM-1 and RM-2 mixtures is 1:1 by weight.

Due to their own increased density, the process fluids No 1 and No 2 form a region of interaction between themselves opposite the perforation holes 2 made in the casing of the well 1. When the process fluids No 1 and No 2 are mixed, the process of interaction between them begins, as a result of which an exothermic reaction is carried out and hydrogen begins to be produced, which through the perforation holes 2 entered the producing formation 3. In this case, the following reactions begin to occur in the sump of well 1:

$$NaH + H_2O = H_2 + NaOH + Q \quad (1)$$

Formed as a result of reaction 1, sodium hydroxide removes the oxide film from the surface of the powdered nanoaluminum Al, resulting in the reaction:

$$Al + H_2O = Al_2O_3 + H_2 + Q \quad (2)$$

Hydrogen released in the reactions 1 and 2, due to the fact that the hydroreacting components are located opposite the perforation holes, immediately enters producing formation 3. As a result, oil hydrocracking, as well as multi-stage destructive hydrogenation, consisting of enrichment of paraffins with hydrogen—hydrogenation—and cracking hydrogenated feedstock under hydrogen pressure, in the presence of catalysts, which are zeolites that are part of the sandstone of which the rock consists.

At the same time as reaction 1 and 2, a reaction occurred between sodium nitrite, urea and acid:

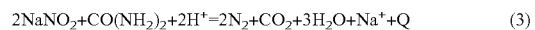
$$2NaNO_2 + CO(NH_2)_2 + 2H^+ = 2N_2 + CO_2 + 3H_2O + Na^+ + Q \quad (3)$$

Carbon dioxide formed by reaction 3 facilitates the washing off of the oil film covering the rock grains and reduced the possibility of rupture of the water film. As a result, droplets of oil at low interfacial tension freely moved in the pores and microcracks of the rock and the phase permeability of the oil increases. It should be noted that when $CO_2$ is dissolved in oil, the viscosity of the oil decreases, the density increases, and the volume increases significantly: the oil swells. An increase in oil volume by 1.5-1.7 times when dissolving $CO_2$ in it makes a particularly large contribution to increasing oil recovery in the development of fields containing low-viscosity oils.

As a result of reaction 1, 2 and 3, the heat generated is necessary to start the decomposition of ammonium nitrate, which occurs at a temperature of 110-160° C.:

$$NH_4NO_3=NH_3+HNO_3+Q \quad (4)$$

Also, additional gas creation occurs during hydrolysis, which does not completely react according to the reaction of urea:

$$CO(NH_2)_2+H_2O=CO_2+2NH_3+Q$$

Since ammonia is an inhibitor of the decomposition of ammonium nitrate and can lead to attenuation of the decomposition reaction, o-carborane is used as a compound that reacts with ammonia, and hydrogen was formed as a result of the reaction between ammonia and o-carborane:

$$o\text{-}C_2B_{10}H_{12}+3NH_3=C_2B_9H_{12}+B(NH_2)_2NH_3+H_2 \quad (5)$$

After reaching a temperature of 170-200° C., the next stage of decomposition of ammonium nitrate begins:

$$NH_4NO_3=N_2O+2H_2O+Q \quad (6)$$

which ends when the temperature reaches 200° C. Above this temperature, a rapid decomposition of ammonium nitrate occurs, with a sharp increase in pressure and the creation of pressure pulses in the sump of well 1, which reaches up to 50 MPa, depending on the gas injectivity of the well:

$$2NH_4NO_3=2N_2+4H_2O+O_2+Q \quad (7)$$

Along with the decomposition of ammonium nitrate, decomposition of oxamide nitrate occurs, resulting in, in addition, Gases formed—coolants $CO_2$, $N_2$ with a temperature above 200° C., as well as hydrogen:

$$2C_2O_2(NH_2)_2 \cdot HNO_3=3N_2+4CO_2+2H_2O+3H_2+Q \quad (8)$$

After reaching a temperature of 300° C., decomposition of titanium hydride with the formation of hydrogen begins:

$$TiH_2=Ti+H_2 \quad (9)$$

as well as the decomposition reaction of hydrazine nitrate, which leads to the appearance of additional pressure pulses and an increase in temperature to 300-350° C.:

$$4N_2H_5NO_3=6N_2+10H_2O+O_2 \quad (10)$$

Hydrogen formed in reactions (8) and (9) partially enter the producing formation, and also, partially oxidizing, react with oxygen formed as a result of reactions (7) and (10), which give an additional amount of heat for the formation:

$$2H_2+O_2=2H_2O+Q \quad (11)$$

Thus, due to the impact on the producing formation 3 of hydroreacting and combustible-oxidizing mixtures that are part of the process fluids No 1 and No 2, the formation 3 is heated, its filtration characteristics are improved, the viscosity decreases, and the mobility of the fluid (oil) increases.

The amount of combustion initiator included in the process fluid No 1, which is used as sodium hydride NaH and passivated by an oxide film, nanoaluminum Al powder at a ratio of 1:(2-5) sodium hydride NaH powder to nanoaluminum powder Al, respectively, amounts to 1.0-5.0% of the total mass of process fluids No 1 and No 2. After 4-24 hours after the completion of the first stage, the tubing 4 is lowered to the level of the perforation holes 2 and process fluid No 3 is pumped into the producing formation 3 to expand microcracks and create a branched channel structure for the flow of oil in the rock.

Process fluid No 3 used to implement the second stage of the implementation of the proposed method contained hydrochloric acid HCl with a concentration of 12-15% in the form of an acid solution. Along with this, the composition of the process fluid No 3 includes ammonium chloride $NH_4Cl$ 10.0-12.0 mass %; and glacial acetic acid $CH_3COOH$ 5.0-8.0 mass %, which prevents the formation and precipitation of iron hydroxide, clogging the near-wellbore region of the producing formation 3. The amount of acid solution is calculated according to the standard scheme: 0.4-1.5 $m^3$ per 1 m of the thickness of the producing formation 3. After that, the well is developed using standard methods and the results of the proposed method are evaluated.

Tests have shown that the claimed method of complex impact on the near-wellbore region of the producing formation significantly improves the filtration and hydrodynamic characteristics of the bottom-hole region of the wells and allows an increase of oil production by 2-10 times.

Examples of the implementation of the claimed method.

Tests of the claimed method were carried out at two wells of the Karazhanbas field and at one well of the Zhetybai field, the Republic of Kazakhstan.

Example No 1

Well No 798 Karazhanbas is located on the edge of the Karazhanbas field and does not contact any injection wells. Neighboring wells are characterized by identical productivity indicators, producing formation pressure is much lower than in wells with artificial maintenance of producing formation pressure. It has an effective formation thickness of 7 m. The well is 470 m deep with a perforation region of 396.2-401.0 m, 407.8-408.4 m, and 418.3-420.0 m. Before processing the well flow rate by fluid was 3 $m^3$/day; and the well flow rate by oil was 1.6 tons/day.

To carry out a complex effect on the near-wellbore region of the producing formation, process fluids No 1 (RM-1) and No 2 (RM-2) were prepared, a combustion initiator, which was used as sodium hydride NaH and passivated with an oxide film nanoaluminum powder Al at a ratio of 1:3 powder of sodium hydride NaH to the powder of nanoaluminum Al, respectively, and process fluid No 3 (RM-3).

The amount of RM-1 mixture with a density of 1.3 $g/cm^3$ was 300 l or 390 kg, of which ammonium nitrate $NH_4NO_3$ was 172.0 kg, sodium hydride NaH was 12.0 kg, nanoaluminum powder Al was 36.0 kg, hydrazine nitrate $N_2H_5NO_3$-15.6 kg, oxamide nitrate $C_2O_2(NH_2)_2 \cdot HNO_3$-7.8 kg, dihydroxymethylcarborane $C_4H_{16}B_{10}O_2$ (99.9%)—15.6 kg, hydrocarbon fuel—34.0 kg, sodium chloride NaCl—18.0 kg, nitric acid $HNO_3$—31.2 kg, emulsifier—7.8 kg, water—40.0 kg.

The amount of RM-2 mixture with a density of 1.6 $g/cm^3$ was 250 l or 400 kg, of which sodium nitrite $NaNO_2$—90.0 kg, hydrocarbon fuel—45.0 kg, urea $CO(NH_2)_2$—110.0 kg, 9-BBN $C_{16}H_{30}B_2$—5.0 kg; o-carborane $C_2B_{10}H_{12}$—20.0 kg, potassium chloride KCl—20.0 kg; emulsifier—10.0 kg, water—100.0 kg.

An acid solution containing hydrochloric acid HCl—1300 kg with a concentration of 12.5% was used as the process fluid No 3.

The inventive method was implemented under conditions of well treatment No 798 as follows.

In the well 1, drowned out by the killing fluid (see FIG. 1), the tubing 4 was lowered to the bottom of the well. Further, through the tubing 4, with a killing fluid, in a volume of 1.1 m³, 300 l of process fluid No 1 (RM-1), with a density of 1.3 g/cm³, was pushed. Then (see FIG. 2) the tubing 4 was lifted above the upper section of perforation 2 and installed at a depth of 365 m, after which, 250 L of process fluid No 2 (RM-2) was poured and squeezed with a killing fluid in a volume of 1.1 m³. As a result, the process fluid No 2 entering the region of interaction of the process fluids No 1 and No 2 was mixed with the process fluid No 1, resulting in an exothermic reaction of heat and gas creation with increasing temperature and pressure in the near-wellbore region of the producing formation 3. After that, the pipe and annular space was closed and well 1 was left for 16 hours. After 16 hours, the tube and annular space were opened, the tubing 4 (see FIG. 3) was lowered to the depth of the upper perforation 2—396.0 m, and 1300 kg process fluid No 3 was pumped with a pressure of killing fluid in the volume of 1.5 m³.

After a comprehensive impact on the near-wellbore region of the producing formation, the well entered a stable mode of operation and reached the following productivity: fluid flow rate—5 m³; oil flow rate—3.2 tons/day. Thus, the oil production rate increased by 2 times.

Example No 2

Well No 6047 in Karazhanbas. Well depth—475 m; perforation region: 407.4-409.9 m; 410.3-41 1.3 m; 428.8-432.8 m; 442-446.4 m; 447.2-448.7 m. Productivity data before processing: well flow rate by fluid—31 m³; well flow rate—2.3 tons/day.

To carry out a complex effect on the near-wellbore region of the producing formation, process fluids No 1 (RM-1) and No 2 (RM-2) were prepared, a combustion initiator, sodium hydride NaH, was used and passivated with an oxide film nanoaluminum powder Al at a ratio of 1:3 powder of sodium hydride NaH to powder nanoaluminum Al, respectively, and process fluid No 3 (RM-3).

The amount of RM-1 mixture with a density of 1.3 g/cm³ was 300 l or 390 kg, of which 185.4 kg of ammonium nitrate $NH_4NO_3$, 11.0 kg of sodium hydride NaH, 33.0 kg of nanoaluminum Al powder, hydrazine nitrate $N_2H_5NO_3$—18.6 kg, oxamide nitrate $C_2O_2(NH_2)_2 \cdot HNO_3$—5.7 kg, dihydroxymethylcarborane $C_4H_{16}B_{10}O_2$ (99.9%)—11.8 kg, hydrocarbon fuel—29.4 kg, sodium chloride NaCl—19.5 kg; nitric acid $HNO_3$—28.0 kg, emulsifier 3.0 kg, water 45.0 kg.

The amount of RM-2 mixture with a density of 1.6 g/cm³ was 350 l or 560 kg, of which sodium nitrite $NaNO_2$ was 30.0 kg, hydrocarbon fuel was 56.6 kg, urea $CO(NH_2)_2$ was 140.0 kg, 9-BBN $C_{16}H_{30}B_2$—12.0 kg; o-carborane $C_2B_{10}H_{12}$—27.0 kg, potassium chloride KCl—30.4 kg; emulsifier—14.0 kg, water—150.0 kg.

An acid solution containing hydrochloric acid HCl—1000 kg with a concentration of 14% was used as process fluid No 3.

The inventive method was implemented in the processing conditions of the well No 6047 as follows.

Tubing was lowered into the well drowned out by the killing fluid until the bottom of the well. Then, through tubing, with a killing fluid, in a volume of 1.3 m³, 300 L of process fluid No 1 (RM-1), with a density of 1.3 g/cm³, was pushed. Then the tubing was lifted above the upper perforation and installed at a depth of 390 m, after which, 350 L of process fluid No 2 (RM-2) was poured and squeezed with a killing fluid in a volume of 1.2 m³. As a result, the process fluid No 2 entering the region of interaction between the process fluids No 1 and No 2 was mixed with the process fluid No 1, resulting in an exothermic reaction of heat and gas creation with increasing temperature and pressure in the near-wellbore region of the producing formation. After that, the tube and annulus were closed and the well was left for 24 hours. After 24 hours, the tube and annular spaces were opened, the tubing was lowered to a depth of the upper perforation section of 407 m, and pumped, with a squeezing fluid extruding in the volume of 1.5 m³, 1000 kg of process fluid No 3.

After a comprehensive impact on the near-wellbore region of the productive formation, the well entered a stable mode of operation and reached the following productivity: fluid flow rate—32.6 m³; oil flow rate—6.72 tons/day. Thus, the oil production rate of the well increased almost 3 times.

Example No 3

Well No 3332 Zhetybai. It has been operating for more than 25 years, neighboring wells are characterized by identical productivity indicators. It is characterized by a low water cut (10%) and a strong gas effect. It has an effective formation thickness of 9 meters. The perforation region is: 2357.0-2360.5 m; 2364.5-2370.5 m.

Density of degassed oil: 0.84 g/cm³, asphalt/resinous/paraffinic substances: up to 28.6%. Oil solidification temperature: +30° C. Producing formation pressure: 173 atm. Downhole pressure: 159 atm.

The average daily productivity 3 months before the treatment: fluid flow rate—5 m³; oil flow rate—3.8 tons/day.

To carry out a complex effect on the near-wellbore region of the producing formation, process fluids No 1 (RM-1) and No 2 (RM-2) were prepared, a combustion initiator, which was used sodium hydride NaH and passivated with an oxide film nanoaluminum powder Al at a ratio of 1:3 powder of sodium hydride NaH to the powder of nanoaluminum Al, respectively, and process fluid No 3 (RM-3).

The amount of RM-1 mixture with a density of 1.3 g/cm³ was 300 L or 390 kg, of which $NH_4NO_3$ ammonium nitrate was 173.0 kg, NaH sodium hydride was 10.0 kg, Al nanoaluminum powder was 30.0 kg, hydrazine nitrate $N_2H_5NO_3$—18.5 kg, oxamide nitrate $C_2O_2(NH_2)_2 \cdot HNO_3$—11.7 kg, dihydroxymethylcarborane $C_4H_{16}B_{10}O_2$—7.0 kg hydrocarbon fuel—33.6 kg, sodium chloride NaCl—19.5 kg, $HNO_3$ nitric acid—35.0 kg, emulsifier—11.7 kg, water—40.0 kg.

The amount of RM-2 mixture with a density of 1.6 g/cm³ was 250 l or 400 kg, of which sodium nitrite $NaNO_2$ was 92.0 kg, hydrocarbon fuel was 51.0 kg, urea $CO(NH_2)_2$ was 100.0 kg, 9-BBN $C_{16}H_{30}B_2$—5.0 kg; o-carborane $C_2B_{10}H_{12}$—10.0 kg, potassium chloride KCl—22.0 kg; emulsifier—10.0 kg, water—110.0 kg.

An acid solution containing hydrochloric acid HCl—1250 kg with a concentration of 12.5% was used as process fluid No 3.

The inventive method was implemented in the processing conditions of the well No 3332 as follows.

Tubing was lowered into the well drowned out by the killing fluid until the bottom of the well. Further, through the tubing, with a killing fluid, in a volume of 7.1 m$^3$, 300 l of process fluid No 1 (RM-1), with a density of 1.3 g/cm$^3$, was pushed. Then the tubing was lifted above the upper section of perforation 2 and installed at a depth of 2340 m, after which, 400 l of process fluid No 2 (RM-2) was poured and squeezed with a killing fluid of 7.1 m$^3$. As a result, the process fluid No 2 entering the region of interaction between the process fluids No 1 and No 2 was mixed with the process fluid No 1, resulting in an exothermic reaction of heat and gas creation with increasing temperature and pressure in the near-wellbore region of the producing formation. After that, the tube and annulus were closed and the well was left for 24 hours. After 24 hours, the tube and annulus were opened, the tubing was lowered to a depth of the upper perforation section—2358 m, and 1250 kg of process fluid No 3 was pumped, with a killing fluid with a volume of 5.5 m$^3$.

After a comprehensive impact on the near-wellbore region of the productive formation, the well entered a stable mode of operation and reached the following productivity: fluid flow rate—26.7 m$^3$; oil flow rate—21.0 tons/day. Thus, the oil production rate of the well increased 5.5 times.

Technical Result

The technical result of the present invention is a complex effect on the near-wellbore region of the producing formation, in which, along with the chemical and thermal effects on the producing formation, the physical effect is also ensured by creating pressure pulses generated by the creating gases, resulting in improved filtration and hydrodynamic characteristics of the near-wellbore region of the producing formation, as well as a significant increase in the permeability of the producing formation and the flow rate of the wells.

What is claimed is:

1. A method for exerting a combined effect on a near-wellbore region of a producing formation, comprising:
   filling at least one section of a perforation located in the near-wellbore region with water or a killing fluid,
   through a tubing installed to a bottom hole, providing a first composition having a density of 1.3-1.4 g/cm$^3$, after which said tubing is installed at a height of 20-25 m above an upper section of the perforation, after which
   a second composition having a density of 1.6-1.8 g/cm$^3$ is provided through said tubing into a region of interaction of said first and second compositions, said first and second compositions interacting through the perforation in the near-wellbore region of the producing formation,
   said first and second compositions interacting resulting in an exothermic reaction forming heat and gas with increasing temperature and pressure respectively, in the near-wellbore region of the producing formation, which in turn leads to a heating of the producing formation,
   said forming of heat and gas in the near-wellbore region of the producing formation leading to a formation of microcracks in the producing formation and an improvement in one or more filtration characteristics of the producing formation,
   after a completion of providing said first and second compositions, said tubing being installed in the at least one section of the perforation of the near-wellbore region, providing a third composition through said tubing, said third composition being an acidic solution containing hydrochloric acid with a concentration of 2-5% in an amount of 0.4-1.5 m$^3$ per each meter of a thickness of the producing formation,
   wherein said first composition comprises:
   ammonium nitrate, $NH_4NO_3$—44.0-54.0 mass percent (mass %);
   sodium hydride, NaH—2.8-3.2 mass %;
   powder nanoaluminum, Al—5.6-15.6 mass %;
   hydrazine nitrate, $N_2H_5NO_3$—3.0-5.0 wt. %;
   oxamide nitrate, $C_2O_2(NH_2)_2$—$HNO_3$—1.0-3.0 mass %;
   1,2-bis(hydroxymethyl)-o-carborane, $C_4B_{10}H_{16}O_2$ (99.9%)—3.0-5.0 mass %;
   hydrocarbon fuel—8.0-13.0 mass %;
   sodium chloride, NaCl, and/or potassium chloride, KCl—4.5-5.5 mass %;
   nitric acid, $HNO_3$—7.0-9.0 mass %;
   emulsifier—0.5-3.0 mass %; and
   water—10.0-15.0 mass %,
   wherein said second composition comprises:
   sodium nitrite, $NaNO_2$—18.0-23.0 mass %;
   hydrocarbon fuel—8.0-13.0 mass %;
   urea, $CO(NH_2)_2$—22.0-28.0 mass %;
   9-BBN, $C_{16}H_{30}B_2$—0-3.0 mass %;
   Carborane, $C_2B_{10}H_{12}$(99.9%)—3.0-6.0 mass %;
   sodium chloride, NaCl, and/or potassium chloride, KCl—4.5-5.5 mass %;
   emulsifier—0.5-3.0 mass %; and
   water—24.0-27.0 mass %.

* * * * *